Dec. 7, 1943.  J. H. DORAN  2,336,232
GAS TURBINE POWER UNIT
Filed July 1, 1942
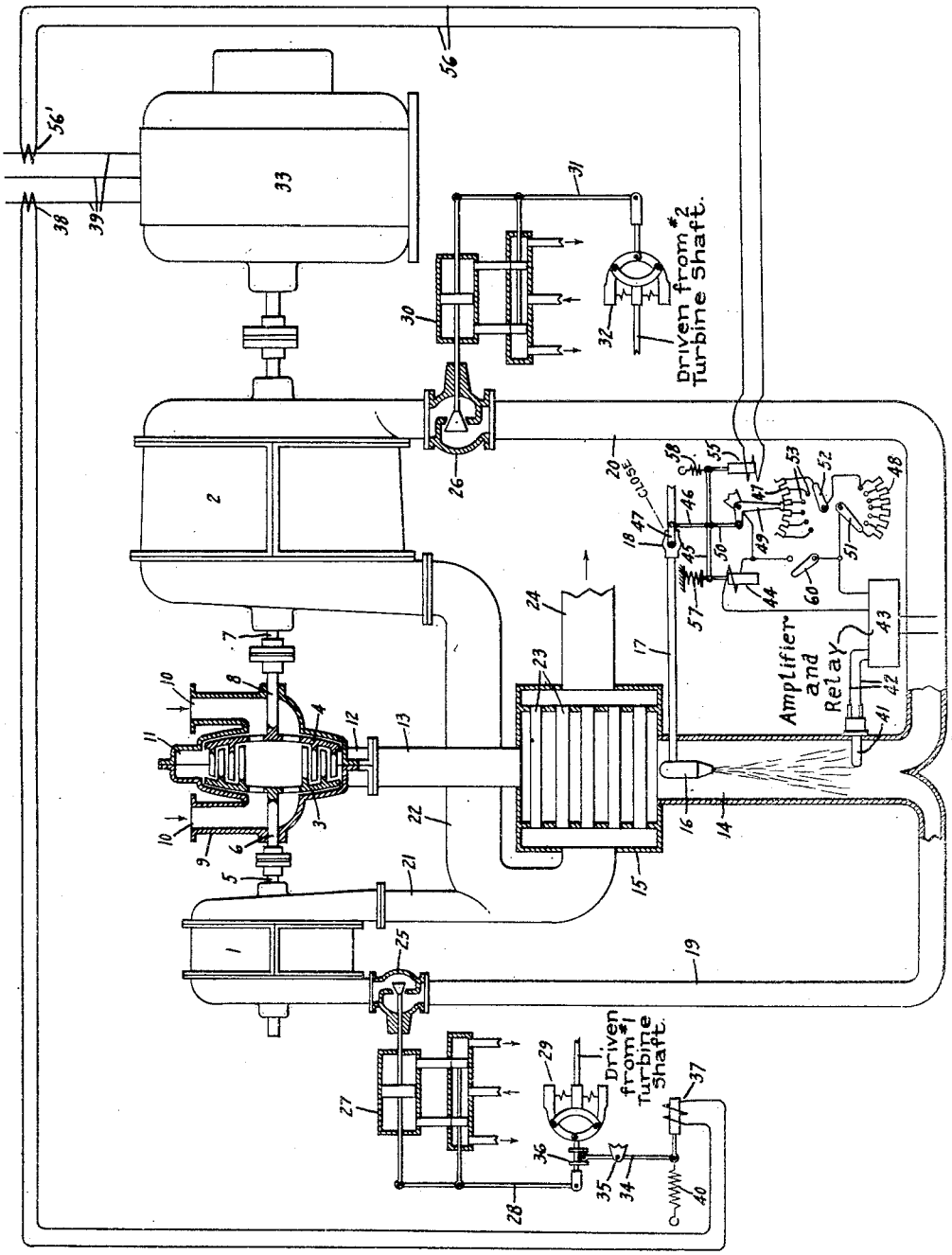
Inventor:
John H. Doran,
by Harry E. Dunlap
His Attorney.

Patented Dec. 7, 1943

2,336,232

UNITED STATES PATENT OFFICE 2,336,232

GAS TURBINE POWER UNIT

John H. Doran, Scotia, N. Y., assignor to General Electric Company, a corporation of New York Application July 1, 1942, Serial No. 449,253

8 Claims. (Cl. 60—41)

The present invention relates to gas turbine power units and has for its object to provide an improved unit of this type.

For a consideration of what I believe to be novel and my invention, attention is directed to the following specification and the claims appended thereto.

In the drawing, the figure is a diagrammatic view of a gas turbine power unit embodying my invention.

Referring to the drawing, 1 and 2 indicate two gas turbines operated by combustion products. They may be of any suitable construction. Gas turbine 1 operates one rotor 3 of a double rotation radial flow compressor, the other rotor 4 being operated by gas turbine 2. To this end, gas turbine 1 has its shaft 5 coupled to shaft 6 of compressor rotor 3 and gas turbine 2 has its shaft 7 coupled to shaft 8 of compressor rotor 4. Rotors 3 and 4 rotate in opposite directions. Each comprises a disk having concentric rings of impeller blades projecting axially therefrom, the rings of respective disks interleaving. The rotors are mounted in a suitable compressor casing 9 provided with inlets 10 and a discharge scroll 11 which terminates in a discharge conduit 12. A double rotation radial flow compressor of this type is known. It is shown only diagrammatically, the diagram being intended to indicate any suitable compressor of this type.

Discharge conduit 12 is connected by a conduit 13 to a combustion chamber 14, there being interposed in the conduit a heat exchanger 15 for heating the air as it flows from the compressor to the combustion chamber. In the combustion chamber is a fuel nozzle 16 which is supplied with fuel through a pipe 17 in which is located a regulating valve 18. Products of combustion generated in combustion chamber 14 are conveyed by a conduit 19 to gas turbine 1 and by a conduit 20 to gas turbine 2. The exhaust from gas turbines 1 and 2 is conveyed by conduits 21 and 22 to the heat exchanger 15, serving as a heating medium for it. Heat exchanger 15 may be of any suitable type. In the present instance, it is shown as being of a tube type, the heating gases from conduits 21 and 22 flowing through the tubes 23 of the heat exchanger and being discharged through conduit 24 to atmosphere or to other suitable point, and the air to be heated flowing over the tubes to the combustion chamber.

In conduit 19 is a regulating valve 25 for controlling the flow of gas to turbine 1 and in conduit 20 is a regulating valve 26 for controlling the flow of gas to turbine 2. Connected with valve 25 is a fluid actuated servo-motor 27 of known type having its operating lever 28 connected to a speed governor 29 driven from the shaft of turbine 1. Connected with regulating valve 26 for gas turbine 2 is a similar fluid actuated servo-motor 30 having its lever 31 connected to a suitable speed governor 32 driven from the shaft of gas turbine 2. Valves 25 and 26 are shown diagrammatically. Any suitable regulating valve structure may be utilized.

Gas turbine 1 is smaller than gas turbine 2. Its sole function is to drive only rotor 3 of the compressor. Gas turbine 2 is larger than gas turbine 1 and in addition to driving the rotor 4 of the compressor, it drives also a load, here indicated, by way of example, as being an alternating current electric generator 33. However, it may be any suitable load. Speed governor 32 is set to regulate valve 26 to maintain the desired speed for gas turbine 2 and similarly speed governor 29 is set to maintain the desired speed for gas turbine 1. If desired, the control on turbine 2 may be adjusted so that the valve 26 is fully open for all normal conditions, the speed governor acting to prevent overspeed. In the case of speed governor 29, the arrangement is such that the setting is modified in accordance with the load delivered by generator 33, the arrangement being such that the speed of gas turbine 1 is increased and decreased as the load on generator 33 increases or decreases, but not necessarily at the same rate. This improves the efficiency at partial loads. To this end, there is provided in connection with speed governor 29 a loading lever 34 which is pivoted at 35 and has one end bearing on collars 36 carried by the spindle of speed governor 29 and the other end connected to the plunger of a solenoid 37 which is in circuit with a load coil 38 connected with one phase of generator 33, it being assumed in the present instance that generator 33 is a three phase alternating current generator, the lead wires from which are indicated at 39. The action of solenoid 37 on lever 34 is opposed by a suitable spring 40. With this arrangement, it will be seen that as the load on generator 33 increases, solenoid 37 will pull the lower end of lever 34 toward the right, thus tending to move the lower end of lever 28 toward the left to move the pilot valve of the servo-motor in a direction to effect an opening movement of valve 25. Similarly, when the load decreases, spring 40 will effect a movement of lever 34 in the opposite direction, lifting the pilot valve and servo-motor to effect movement of valve 25 toward closed position. With this arrangement, increase in load serves to operate gas turbine 1 at a higher speed, thus increasing the pressure of the air delivered by the compressor and the flow of air to the combustion chamber while a decrease in load effects a decrease in the speed of turbine 1 to decrease the pressure of the air delivered by the compressor and the flow of air to the combustion chamber. Viewed from another aspect, it may be considered that solenoid 37 modifies the setting of governor 29; in other words, changes the speed setting of the governor in response to load changes on gas turbine 2.

In combustion chamber 14 is a temperature responsive device 41 which may be in the form of a thermocouple having its lead wires 42 connected through a suitable amplifier and relay 43 to the winding of a solenoid 44, the plunger of which is pivotally connected to one end of a floating lever 45 which in turn is provided with a rigid link 46, the upper end of which is pivotally connected to an arm 47 fixed to the spindle of fuel regulating valve 18. In circuit with the winding of solenoid 44 and connected in series with each other are two rheostats 47 and 48. The arm 49 of rheostat 47 is in the form of a bell crank lever, one arm of which is pivotally connected to a rigid link 50 fixed to lever 45. The arrangement is such that as lever 45 moves to open and close valve 18, it simultaneously adjusts arm 49 to vary the amount of the resistance of rheostat 47 in circuit with the winding of solenoid 44. Rheostat 48 is provided with a manually adjustable regulating arm 51 by means of which the amount of resistance of rheostat 48 in the solenoid winding circuit may be regulated. At 52 is a switch arm adjustable over a series of contacts 53 connected with the winding of rheostat 47. When switch arm 52 is in the position shown in the drawing, movement of lever 45 in a direction to open valve 18 causes arm 49 to cut resistance out of the solenoid winding circuit and movement of lever 45 in a direction to close valve 18 moves arm 49 in a direction to insert more resistance in circuit with the solenoid winding. When switch arm 52 is moved to the left-hand contact 53, then the opposite result is obtained, opening movement of valve 18 serving to insert additional resistance in the solenoid circuit and closing movement of valve 18 serving to decrease the amount of resistance in the circuit of the solenoid winding. The other end of lever 45 is pivotally connected to the plunger of solenoid 55, the winding of which is connected by conductors 56 to a load coil 56' on one of the load leads 39 of generator 33. Upward movement of the plunger of solenoid 44 is opposed by a compression spring 57 and downward movement of the plunger of solenoid 55 is opposed by a tension spring 58. At 60 is a switch by means of which rheostats 47 and 48 may be cut out of the solenoid winding circuit.

Fuel valve 18 is primarily under the control of load coal 56'. As the load on generator 33 increases, the current flowing through the winding of solenoid 55 increases to effect opening movement of fuel valve 18 to supply additional fuel to the combustion chamber. Similarly, upon decrease in load on generator 33, tension spring 58 moves lever 45 against the action of solenoid 55 to move valve 18 toward closed position.

Temperature responsive device 41 functions to maintain a desired temperature in combustion chamber 14. If the temperature in the combustion chamber tends to increase, the current flowing through the winding of solenoid 44 increases lifting the plunger of solenoid 44 against the action of spring 50 to move valve 18 toward closed position, thus decreasing the supply of fuel to the combustion chamber and decreasing the temperature in the combustion chamber. If the temperature in the combustion chamber decreases, then a similar action takes place except in the opposite direction, decrease of current in the circuit of solenoid 44 permitting compression spring 57 to move the plunger downward, thus further opening valve 18 to admit additional fuel to the combustion chamber to increase the temperature therein. The arrangement may be such that the adjustment of valve 18 by the temperature responsive device is primarily a corrective movement which is comparatively small compared to the adjustment of valve 18 by load coil 56'.

Under certain conditions of operation, it may be desirable to have the temperature in the combustion chamber increase with load while under other conditions of operation, it may be desirable to have the temperature in the combustion chamber decrease with an increase in load. Either of these functions is accomplished by means of the rheostat 47 and the switch arm 52. Assume that the parts are in the position shown in the drawing and that an increase in load on generator 33 takes place. The increase in load effects a downward movement of the plunger of solenoid 55 to open further the valve 18 and admit additional fuel to the combustion chamber. At the same time, movement of rheostat arm 49 occurs in a direction to cut resistance out of the circuit of the winding of solenoid 44. This serves to increase the current in the winding of solenoid 44 effecting a movement of the plunger upward to move valve 18 toward closed position. As a result, there is a counteracting movement of valve 18 tending to decrease the amount of fuel supplied to the burner which has a tendency to decrease the temperature in the combustion chamber. If a decrease in temperature in the combustion chamber takes place, then temperature responsive device 41 operates in a direction to decrease the current flowing in the circuit of the winding of solenoid 44, permitting spring 57 to move valve 18 toward open position, thus tending to admit more fuel to increase the temperature in the combustion chamber. As a result of these three forces acting on valve 18, it comes to rest in a stable position but with the temperature in the combustion chamber decreased somewhat with the increase in load. Similarly, a decrease in load on generator 33 effects a similar adjusting of valve 18 except in the opposite direction.

Assume now that switch arm 52 is in engagement with the left-hand contact 53. Now, upon increase in load on generator 53, movement of arm 49 with opening movement of valve 18 will serve to insert additional resistance in the circuit of the winding of solenoid 44, thus decreasing the current in the solenoid circuit and permitting spring 57 to effect a still further opening movement of valve 18. This results in an increase in the supply of fuel to the combustion chamber and an increase in temperature with load. Similarly, a decrease in the load on generator 33 effects a similar adjustment of valve 18 except in the opposite directions. In any case, adjustment of rheostat arm 49 varies the resistance in the circuit of the winding of solenoid 44, thus in effect setting the control parts responsive to temperature responsive device 41 for a different combustion chamber temperature. By setting arm 49 on an intermediate contact 53, any desired regulation of temperature with load may be obtained.

By adjusting arm 51 to vary the amount of the resistance of rheostat 48 in the circuit of solenoid 44, the apparatus may be set for different temperatures in the combustion chamber since rheostaat 48 is directly in the circuit of the winding of solenoid 44. By closing switch 60, rheostats 47 and 48 may be short circuited whereby both are put out of action. Under these circumstances, the temperature maintained in the combustion chamber is not modified with increase and decrease in load, the apparatus then operating to maintain constant temperature at all loads.

As will be clear, compressor rotors 3 and 4 may be operated at different speeds. In fact, the speed of rotor 4 may be substantially constant, the speed of rotor 3 being varied to regulate the output of the compressor. In some instances, generator 33 may be tied in with other generators on the same line so that its speed is fixed by the frequency of the system with which it is connected.

My improved unit has the advantage that it is relatively simple in structure, easily controlled, gives good overall efficiency, and is capable of being built at low cost.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination, a compressor having two separate rotors, a load, a first gas turbine for driving one compressor rotor, a second gas turbine for driving the other compressor rotor and the load, means to which the compressor supplies air for generating and supplying gas to said turbines, means for effecting operation of said second gas turbine at substantially constant speed, and means for regulating the speed of the first gas turbine responsive to the load on the second gas turbine.

2. In combination, a compressor having two separate rotors, a load, a first gas turbine for driving one compressor rotor, a second gas turbine for driving the other compressor rotor and the load, a combustion chamber to which the compressor supplies air and which supplies gas to the gas turbines, means for supplying fuel to the combustion chamber, means for regulating the flow of gas from the combustion chamber to said turbines, and means responsive to the temperature in said combustion chamber and to the load for regulating the fuel supplying means.

3. In combination, a double rotation, radial flow compressor, a load, a turbine for driving one rotor of the compressor and the load, a turbine for driving the other rotor of the compressor, a governor for each turbine for regulating its operation, and a combustion chamber to which the compressor supplies air for supplying actuating fluid to said turbines.

4. In combination, a compressor having two separate rotors, a load, a first gas turbine for driving one compressor rotor, a second gas turbine for driving the other compressor rotor and the load, means to which the compressor supplies air for generating and supplying gas to said turbines, means for effecting operation of said second gas turbine at substantially constant speed, a speed governor for the first gas turbine, and means responsive to the load on the second gas turbine for modifying the setting of said speed governor.

5. In combination, a double rotation, radial flow compressor, a load, a turbine for driving one rotor of the compressor and the load, a turbine for driving the other rotor of the compressor, a speed governor for each turbine for regulating its operation, means responsive to the load on the first-named turbine for modifying the setting of the governor for the second-named gas turbine, and a combustion chamber to which the compressor supplies air for supplying actuating fluid to said turbines.

6. In combination, a compressor having two separate rotors, a load, a first gas turbine for driving one compressor rotor, a second gas turbine for driving the other compressor rotor and the load, a combustion chamber to which the compressor supplies air and which supplies gas to the gas turbines, means for supplying fuel to the combustion chamber, a governor for each turbine for regulating the flow of gas from the combustion chamber to it, and means responsive to the temperature in the combustion chamber for regulating said fuel supplying means.

7. In combination, a compressor having two separate rotors, a load, a first gas turbine for driving one compressor rotor, a second gas turbine for driving the other compressor rotor and the load, a combustion chamber to which the compressor supplies air and which supplies gas to the gas turbines, means for supplying fuel to the combustion chamber, a governor for each turbine for regulating the flow of gas from the combustion chamber to it, means responsive to the temperature in the combustion chamber for regulating said fuel supplying means, and means responsive to the load on the second gas turbine for modifying the setting of the governor for the first gas turbine.

8. In combination, a compressor having two separate rotors, a load, a first gas turbine for driving one compressor rotor, a second gas turbine for driving the other compressor rotor and the load, a combustion chamber to which the compressor supplies air and which supplies gas to the gas turbines, means for supplying fuel to the combustion chamber, a governor for each turbine for regulating the flow of gas from the combustion chamber to it, means responsive to the temperature in the combustion chamber and to the load on the second gas turbine for regulating said fuel supplying means, and means responsive to the load on the second gas turbine for modifying the setting of the governor for the first gas turbine.

JOHN H. DORAN.